J. W. LAMBERT.
POWER TRANSMISSION.
APPLICATION FILED NOV. 9, 1908.
1,013,786.
Patented Jan. 2, 1912.
2 SHEETS—SHEET 2.
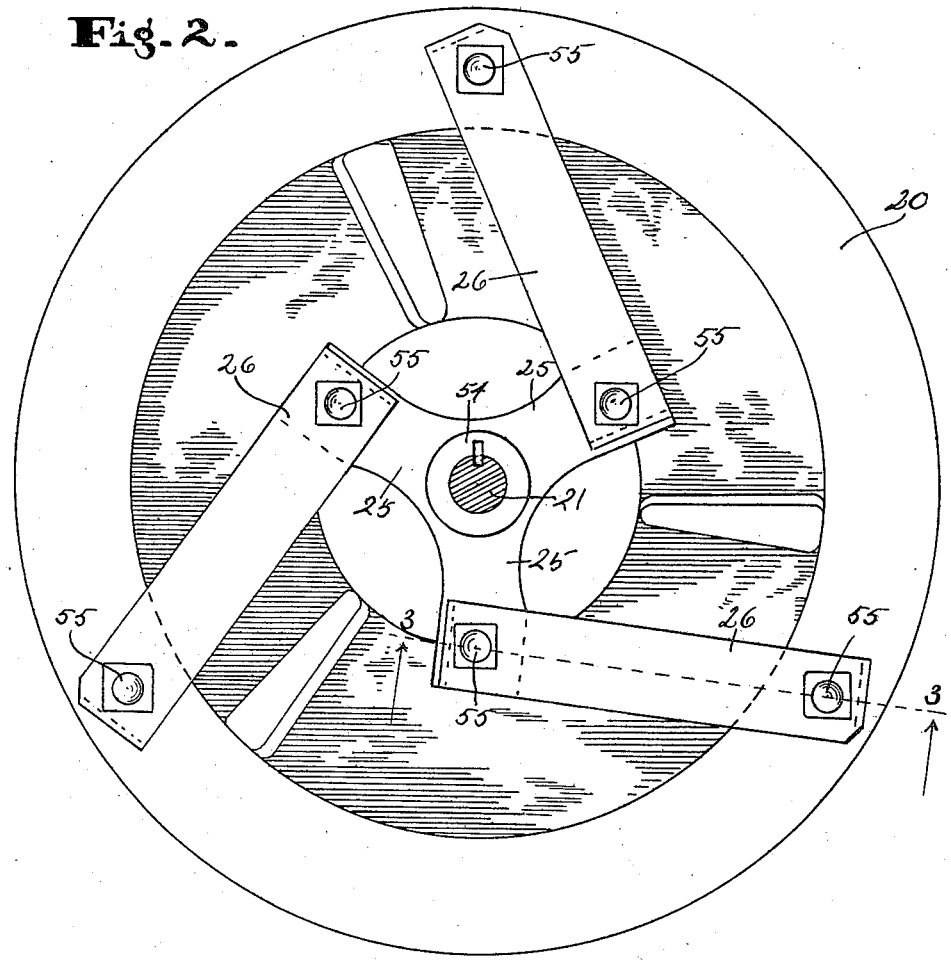
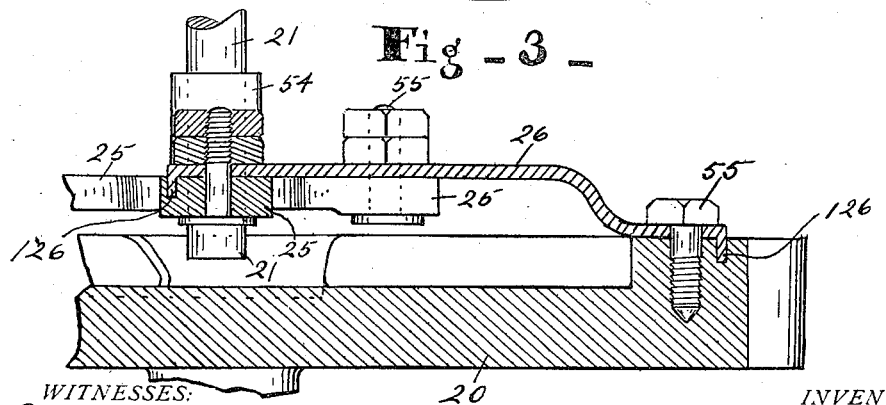
WITNESSES:
O. M. McLaughlin
W. M. Gentle
INVENTOR.
John W. Lambert
BY
V. H. Lockwood
ATTORNEY.

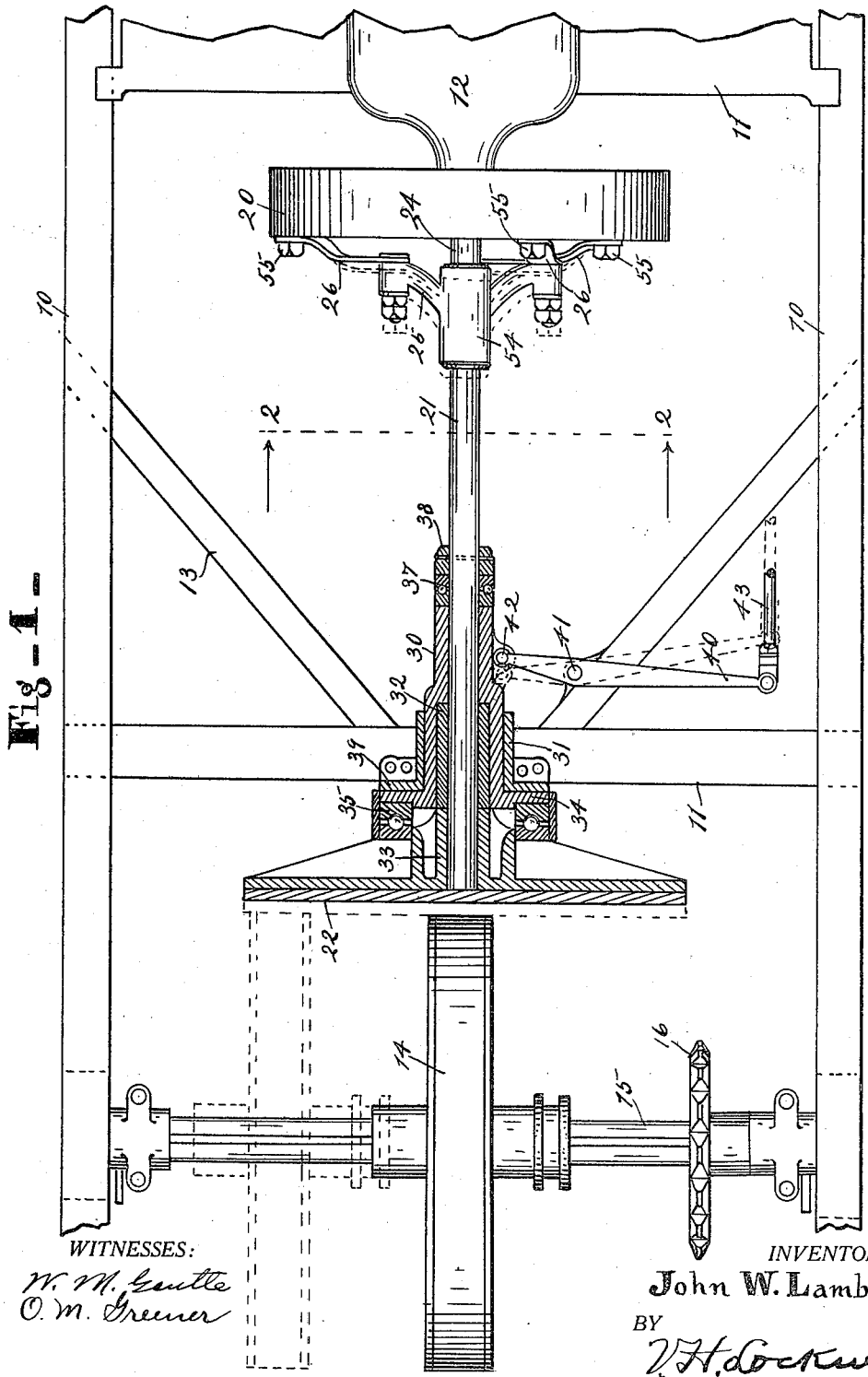

UNITED STATES PATENT OFFICE.

JOHN W. LAMBERT, OF ANDERSON, INDIANA.

POWER TRANSMISSION.

1,013,786.  Specification of Letters Patent.  Patented Jan. 2, 1912.

Application filed November 9, 1908. Serial No. 461,787.

*To all whom it may concern:*

Be it known that I, JOHN W. LAMBERT, of Anderson, county of Madison, and State of Indiana, have invented a certain new and useful Power Transmission; and I do hereby declare that the following is a full, clear, and exact description thereof, reference being had to the accompanying drawings, in which like letters refer to like parts.

The object of this invention is to improve the construction and mode of operation of friction drive mechanism for automobiles and other devices. In such mechanism, the friction transmission requires at least one of the friction disk members to be mounted so as to be movable for separating the disks when desired for varying the degree of pressure between the disks during the operation of the device.

The chief feature of the invention consists in mounting the shaft of the driving friction disk so as to have some longitudinal movement with reference to the driven disk or member and also with reference to the fly wheel of the engine or other driving means from which power is transmitted to said shaft and driving friction member. To that end flat springs are provided with one end of each secured to a spider on the longitudinally movable driving shaft so as to extend substantially at right angle through the shaft and spider and the other end of each spring is secured to the side of the fly wheel. With this arrangement the rotary movement of the fly wheel will be immediately and positively transmitted to the shaft, without any play or lost motion and the flexibility of the flat springs will permit longitudinal movement of the shaft without in any degree interfering with the effective transmission of power from the fly wheel to the shaft. This construction will also prevent any rattling or noise in the parts connecting the fly wheel and shaft; and the construction is very simple and strong.

The full nature of this invention will be understood from the accompanying drawings and the following description and claim.

In the drawings Figure 1 is a plan view of a portion of an automobile frame with a portion of the driving mechanism shown partly in plan and partly in horizontal section. Fig. 2 is a section on the line 2—2 of Fig. 1, showing the fly wheel in elevation. Fig. 3 is a section on the line 3—3 of Fig. 2.

There is shown in the drawings a suitable frame formed of longitudinal side bars 10 and cross bars 11. The engine 12 is mounted near what may be termed the front of the automobile frame. There are diagonal braces 13 for the frame, and a driven disk 14 splined slidably on the shaft 15 which carries a sprocket 16 from which power is transmitted to the axle of the automobile, which is not shown.

The engine 12 is provided with a fly wheel 20 and power is transmitted from that fly wheel and through the shaft 21 for driving the friction disk or member 22, the side face of which is in engagement with the periphery of the driven friction member 14. The shaft 21 is co-axial with but independent of the engine shaft 24 on which the fly wheel is secured. A sleeve 54 is secured on the end of the shaft 21 adjacent the engine shaft 24 and said sleeve surrounds the end and is slidable of said engine shaft 24. The sleeve 54 has three arms 25, said sleeve and arms constituting a spider. These arms are equidistant from each other as shown in Fig. 2. To the end of each arm of the spider a flat spring 26 is rigidly secured and each of said springs is at its outer end rigidly secured to the side of the fly wheel near the periphery thereof. These springs are secured at each end rigidly by cap screws 55 and may be bent somewhat as shown in Fig. 3, although that is not necessary. They extend non-radially of the wheel and substantially tangentially of the circular path of movement of the portion of the arms with which said springs are connected as shown in Fig. 2 and should be wide enough to be rigid in the transmission of rotary power from the fly wheel to effect the torsional movement of the shaft 21, and yet be flexible enough to permit said shaft 21 to be moved longitudinally somewhat. The ends of each spring 26 are in-turned at 126 and project into corresponding recesses or sockets in the arms 25 and the disk 20, as shown in Fig. 3, which prevents any twisting movement of the springs 26 under the torsional strain caused by the revolution of the wheel and maintains a uniform angularity between the arms 25, springs 26 and the surface of the wheel. The springs extend from the arms 25 substantially at a right angle, that is, at a right angle to a diametric line through the shaft, so that the shaft will receive the full effect of the pull of the springs on the arms at all times.

The shaft 21 has a sliding bearing 30 that is mounted in a fixed bearing 31 secured to the cross frame bar 11. The rear half of the sliding bearing 30 is enlarged to receive the sleeve 32 that at its front end abuts against a shoulder in the bearing 30 and at its rear end fits against a sleeve 33 from the driving friction disk 22. The rear end of the bearing 30 is provided with a radial flange 34 and between that radial flange and the driving disk 22 there is a ball bearing 35 to resist and take up end thrusts. There is also a ball bearing 37 at the other end of the bearing 30 and held in place by the fixed collar 38 on the shaft 21. The bearing 30 has no rotary movement but it is capable of longitudinal movement in the bearing 31. Thus it can be moved to the left from the position shown in Fig. 1 and back to the position therein shown. A radial flange 39 on the rear side of the bearing 31 limits the right hand or forward movement of the bearing 30. And since the bearing 30 is located between fixed parts of the shaft 21, any longitudinal movement of the bearing 30 will cause a corresponding movement of the shaft 21 and disk 22. Said parts are moved longitudinally by the lever 40 that is fulcrumed to the bracket 41 secured to the frame of the machine. The inner end of the lever 40 projects and operates in a recess 42 in the sleeve. Said lever is actuated from the forward part of the automobile through a suitable lever or pedal, not shown, and the connecting rod 43. Therefore, with this adjustable connection the means for giving longitudinal movement to the friction disk 22 can be very sensitively adjusted so that the slightest movement of rod 43 will cause a corresponding movement of the disk 22, and by this means said disk 22 can be brought into lesser or greater frictional engagement with the driven disk 14, whenever such additional friction is necessary, or be separated to stop the transmission of power from one friction member to the other.

What I claim as my invention and desire to secure by Letters Patent is:

Friction transmission mechanism including a wheel for transmitting power, a longitudinally movable shaft mounted independently of and concentrically with said wheel, arms secured to and projecting from the end of said shaft near said wheel, and flat springs secured at their ends to the side of the wheel and to the ends of said arms and extending non-radially of the wheel, the ends of said springs being turned at a right angle and fitting in sockets in said arms and wheel to maintain the constant relative angularity of the arms, springs and wheel.

In witness whereof, I have hereunto affixed my signature in the presence of the witnesses herein named.

JOHN W. LAMBERT.

Witnesses:
GUSTAVUS A. EITELMANN,
ALBERT S. MCGRANAHAN.

---

Copies of this patent may be obtained for five cents each, by addressing the "Commissioner of Patents, Washington, D. C."